US012391869B2

(12) United States Patent
Ayyappanpillai et al.

(10) Patent No.: US 12,391,869 B2
(45) Date of Patent: Aug. 19, 2025

(54) THERMO-RESPONSIVE MOLECULES FOR CONTROLLED HEAT AND LIGHT TRANSMISSION WINDOWS AND APPLICATIONS THEREOF

(71) Applicant: COUNCIL OF SCIENTIFIC AND INDUSTRIAL RESEARCH, New Delhi (IN)

(72) Inventors: Ajayaghosh Ayyappanpillai, Thiruvananthapuram (IN); Satyajit Das, Thiruvananthapuram (IN); Suraj Soman, Thiruvananthapuram (IN); Adersh Asok, Thiruvananthapuram (IN); Sreejith Shankar Pooppanal, Thiruvananthapuram (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 317 days.

(21) Appl. No.: 17/757,531

(22) PCT Filed: Oct. 16, 2020

(86) PCT No.: PCT/IN2020/050884
§ 371 (c)(1),
(2) Date: Jun. 16, 2022

(87) PCT Pub. No.: WO2021/124343
PCT Pub. Date: Jun. 24, 2021

(65) Prior Publication Data
US 2023/0028718 A1    Jan. 26, 2023

(30) Foreign Application Priority Data

Dec. 18, 2019  (IN) ............................. 20191105250.6

(51) Int. Cl.
*C09K 9/02* (2006.01)

(52) U.S. Cl.
CPC ........ *C09K 9/02* (2013.01); *C09K 2211/1007* (2013.01); *C09K 2211/1014* (2013.01)

(58) Field of Classification Search
CPC .............. C09K 9/02; C09K 2211/1007; C09K 2211/1014
See application file for complete search history.

(56) References Cited

U.S. PATENT DOCUMENTS 5,430,104 A   7/1995 Siol et al.
9,550,168 B2  1/2017 Gough et al.
(Continued)

FOREIGN PATENT DOCUMENTS

CN   102892834 A   1/2013
CN   108558701 A   9/2018
(Continued)

OTHER PUBLICATIONS

Djibril Faye, Haitao Zhang, Jean-Pierre Lefevre, Jérémy Bell, Jacques A. Delaire and Isabelle Leray, Mercury detection in a microfluidic device by using a molecular sensor soluble in organoaqueous solvent, Photochem. Photobiol. Sci., 2012, 11, 1737-1743 (Year: 2012).*

(Continued)

Primary Examiner — Bijan Ahvazi
(74) Attorney, Agent, or Firm — Schwegman Lundberg & Woessner, P.A.

(57) ABSTRACT

The present invention relates to design and applications of a class of water-soluble small molecules represented by Formula 1. In aqueous solutions the said molecules exhibit lower critical solution temperature (LCST) phase transition near room temperature, imparting a temperature triggered switching of transparency stages. Further, it discloses a solution comprising Formula 1 and a scalable smart radiative energy management system that takes form of a (Continued)

dynamic window, wherein the aqueous solution is sandwiched between two transparent glass panes to enable modulation of light and heat transmission. With simple and economical starting materials, the dynamic windows of present invention represent leaps towards creating a niche technology with multifarious applications in developing scalable, smart energy management systems for indoor building environments.

12 Claims, 3 Drawing Sheets

(56) References Cited

U.S. PATENT DOCUMENTS

| | | | |
|---|---|---|---|
| 2012/0234465 | A1 | 9/2012 | Wen et al. |
| 2015/0299563 | A1* | 10/2015 | Ayyappanpillai .... B42D 25/415 427/7 |

FOREIGN PATENT DOCUMENTS

| | | |
|---|---|---|
| KR | 20190060304 A | 6/2019 |
| WO | WO-2015130012 A1 | 9/2015 |
| WO | WO-2021124343 A1 | 6/2021 |

OTHER PUBLICATIONS

"Chinese Application No. 202080067883.1, First Office Action dated Sep. 26, 2023", (Sep. 26, 2023), 10 pgs.
"European Application No. 20901691, Supplementary European Search Report dated Nov. 20, 2023", (Nov. 20, 2023), 1 pg.
"India Application No. 201911052506, Examination report dated Aug. 11, 2023", (Aug. 11, 2023), 6 pgs.
Faye, Djibril, et al., "Mercury detection in a microfluidic device by using a molecular sensor soluble in organoaqueous solvent", Photochem. Photobiol. Sci., 2012, 11, 1737-1743, (Jul. 25, 2012), 1737-1743.
Li, Qiangjun, et al., "Multistimuli-responsive small-molecule compound with aggregation-induced emission enhancement characteristics: preparation, properties and applications", New J. Chem., 2018, 42, 20239-20248, (2018), 20239-20248.
Li, Qiangjun, et al., "Preparation and characterization of a multistimuliresponsive photoluminescent monomer and its corresponding polymer", Polym. Chem., 2018, 9, 5521-5530, (2018), 5521-5530.
Li, Xiaoying, et al., "Multi-modulation for self-assemblies of amphiphilic rigid-soft compounds through alteration of solution polarity and temperature", Soft Matter, 2017, 13, 8408-8418, (2017), 8408-8418.
Nicoud, Jean-Francois, et al., "Boron-Containing Two-Photon-Absorbing Chromophores. 3.1 One- and Two-Photon Photophysical Properties of p-Carborane-Containing Fluorescent Bioprobes", Inorg. Chem. 2011, 50, 4272-4278 // dx.doi.org/10.1021/ic102043v, (Apr. 14, 2011), 4272-4278.
Zhu, Yicheng, et al., "Design of Thermoresponsive Polymers with Aqueous LCST, UCST, or Both: Modification of a Reactive Poly(2-vinyl-4,4-dimethylazlactone) Scaffold", Macromolecules 2016, 49, 672-680 // DOI: 10.1021/acs.macromol.5b02056, (Jan. 5, 2016), 672-680.

"International Application No. PCT/IN2020/050884, International Search Report and Written Opinion mailed Jan. 18, 2021", (Jan. 18, 2021), 9 pgs.
Aathimanikandan, Sivakumar V., et al., "Temperature-Sensitive Dendritic Micelles", J. Am. Chem. Soc. 2005, 127 (42), 14922-14929, (2005), 14922-14929.
Betancourt, Jose E., "Nonpolymeric Thermosensitive Supramolecules", J. Am. Chem. Soc. 2009, 131, 16666-16668, (Nov. 2, 2009), 16666-16668.
Das, Satyajit, et al., "Supramolecular Gel Phase Controlled [4+2] Diels-Alder Photocycloaddition for Electroplex Mediated White Electroluminescence", J. Am. Chem. Soc. 2019, 141, 14, 5635-5639, (Mar. 29, 2019), 5635-5639.
De La Rosa, Victor R., et al., "Supramolecular control over thermoresponsive polymers", Materials Today, vol. 19, No. 00, Jul. 2015, (Jul. 2015), 44-55.
Fuller, Jack M., et al., "Temperature-Sensitive Transitions below LCST in Amphiphilic Dendritic Assemblies: Host-Guest Implications", J. Am. Chem. Soc. 2013, 135, 8947-8954, (May 21, 2013), 8947-8954.
Gohy, Jean-Francois, et al., "Photo-responsive block copolymer micelles: design and behavior", Chem. Soc. Rev., 2013, 42, 7117-7129, (2013), 7117-7129.
Higashiguchi, Kenji, et al., "Photoinduced Macroscopic Morphological Transformation of an Amphiphilic Diarylethene Assembly: Reversible Dynamic Motion", J. Am. Chem. Soc. 2015, 137, 2722-2729, (Feb. 4, 2015), 2722-2729.
Hirose, Takashi, et al., "Self-Assembly of Photochromic Diarylethenes with Amphiphilic Side Chains: Reversible Thermal and Photochemical Control", J. Org. Chem. 2006, 71, 7499-7508, (May 16, 2006), 7499-7508.
Lee, Sumi, et al., "Nonpolymeric Thermosensitive Benzenetricarboxamides", Langmuir 2011, 27(5), 1560-1564, (Dec. 30, 2010), 1560-1564.
Lubtow, M., et al., "Self-Assembly of 9,10-Bis(phenylethynyl) anthracene (BPEA) Derivatives: Influence of pi-pi and Hydrogen Bonding Interactions on Aggregate Morphology and Self-Assembly Mechanism", Chem. Eur. J. 2017, 23 6198-6205, (2017), 6198-6205.
Ogoshi, Tomoki, et al., "Photoreversible Switching of the Lower Critical Solution Temperature in a Photoresponsive Host-Guest System of Pillar[6]arene with Triethylene Oxide Substituents and an Azobenzene Derivative", J. Am. Chem. Soc. 2012, 134, 49, 20146-20150, (Nov. 19, 2012), 20146-20150.
Peng, Hui-Qing, et al., "Visualizing the Initial Step of Self-Assembly and the Phase Transition by Stereogenic Amphiphiles with Aggregation-Induced Emission", ACS Nano, 2019, 13. 1, 839-846, (Dec. 11, 2018), 839-846.
Richards, Gary J., et al., "Designing Lower Critical Solution Temperature Behavior into a Discotic Small Molecule", J. Phys. Chem. Lett. 2010, 1, 1336-1340, (Apr. 9, 2010), 1336-1340.
Schild, H. G., "Poly(N-Isopropylacrylamide): Experiment, Theory and Application", Prog. Polym. Sci., vol. 17, 163-249, (1992), 163-249.
Seeboth, Arno, et al., "Thermotropic and Thermochromic Polymer Based Materials for Adaptive Solar Control", Materials 2010, 3, 5143-5168; doi:10.3390/ma3125143, (Dec. 6, 2010), 5143-5168.
Wei, Peifa, et al., "A Discrete Amphiphilic Organoplatinum(II) Metallacycle with Tunable Lower Critical Solution Temperature Behavior", J. Am. Chem. Soc. 2014, 136, 15497-15500, (Oct. 23, 2014), 15497-15500.

* cited by examiner

THERMO-RESPONSIVE MOLECULES FOR CONTROLLED HEAT AND LIGHT TRANSMISSION WINDOWS AND APPLICATIONS THEREOF

PRIORITY CLAIM TO RELATED APPLICATIONS

This application is a U.S. national stage filing under 35 U.S.C. § 371 from International Application No. PCT/IN2020/050884, filed on 16 Oct. 2020, which claims priority to India Application No. 201911052506, filed on 18 Dec. 2019. This application incorporates by reference the entirety of International Application No. PCT/IN2020/050884 and its published version WO2021/124343 (published 24 Jun. 2021).

FIELD OF THE INVENTION

The present invention relates to the development and applications of thermo-responsive molecules of Formula 1. In particular, the invention relates to solution comprising Formula 1 and dynamic windows fabricated by sandwiching a solution of desired concentration of the said molecules of formula 1 between 2 glass panes, whereby based on temperature stimuli, the window changes its opacity and colour. With simple and economical starting materials the dynamic windows of present invention represent leaps towards creating a niche technology with multifarious applications in developing scalable, smart energy management systems for indoor building environments.

BACKGROUND AND PRIOR ART OF THE INVENTION

Responsive materials exhibiting controllable light and heat transmission properties are of tremendous interest, especially for the realization of energy-efficient buildings. A large number of research articles and patents cover this area, however, most majority of these reports deal with materials or systems that are responsive at a higher expense of energy input in the form of electricity, heat, etc. Accordingly, there are several classes of responsive materials, where the stimuli responsible for the change in properties are electricity (electrochromic materials), temperature (thermochromic materials), etc. A dynamic system of this nature that switches its opacity/transparency at temperatures near ambient temperature (25-30° C.), without the need for additional energy input, are rarely reported.

In this context, materials exhibiting lower critical solution temperature (LCST) behavior are of particular interest. These materials in their solutions switch between transparent and opaque phases below and above the critical temperature respectively (Hoogenboom et al. Supramolecular Control over Thermo-responsive Polymers. *Materials Today* 2016, 19, 44-55). In general, solutions of materials exhibiting LCST behaviour are opaque above and transparent below the critical temperature.

Hydrophilic acrylamide-based polymers and co-polymers such as NIPAM undergo phase transition or change in their size or volume upon increasing the temperature beyond LCST (Schild, Poly(N-isopropylacrylamide): experiment, theory and application *Polym. Sci.* 1992, 17, 163).

While several polymers have been shown to exhibit LCST behavior, small molecule-based LCST systems are rare. However, LCST behavior has been recently reported in large molecular systems such as discotic molecules (Richards, et al. Designing Lower Critical Solution Temperature Behavior into a Discotic Small Molecule *J. Phys. Chem. Lett.*, 2010, 1, 1336-1340), dendrimers (Aathimanikandan, et al. Savariar, E. N.; Thayumanavan S. Temperature-Sensitive Dendritic Micelles. *J. Am. Chem. Soc.*, 2005, 127, 14922-14929; Fuller, et al. Temperature-Sensitive Transitions below LCST in Amphiphilic Dendritic Assemblies: Host-Guest Implications. *J. Am. Chem. Soc.* 2013, 135, 8947-8954), supramolecular assemblies (Lee, S.; Lee, et al. Non-polymeric Thermosensitive Benzenetricarboxamides. *Langmuir* 2011, 27, 1560-1564; Hirose, et al. Self-Assembly of Photochromic Diarylethenes with Amphiphilic Side Chains: Reversible Thermal and Photochemical Control. *J. Org. Chem.* 2006, 71, 7499-7508; Betancourt, et al. Non-polymeric Thermo-sensitive Supramolecules. *J. Am. Chem. Soc.* 2009, 131, 16666-16668), host-guest complexes (Ogoshi, et al. Photoreversible Switching of the Lower Critical Solution Temperature in a Photoresponsive Host-Guest System of Pillar[6]arene with Triethylene Oxide Substituents and an Azobenzene Derivative. *J. Am. Chem. Soc.* 2012, 134, 20146-20150) and metallocycles (Wei, et al. A Discrete Amphiphilic Organoplatinum(II) Metallacycle with Tunable Lower Critical Solution Temperature Behavior *J. Am. Chem. Soc.* 2014, 136, 15497-15500).

Photoresponsive polymers having LCST phase behavior have also been reported in the literature (Gohy, et al. Photo-responsive block copolymer micelles: design and behavior *Chem. Soc. Rev.*, 2013, 42, 7117-7129).

LCST is a comparably common phenomenon in polymers and large-molecule assemblies. However, small molecules derived LCST systems are not frequently found in the literature (Peng, et al. Visualizing the Initial Step of Self-Assembly and the Phase Transition by Stereogenic Amphiphiles with Aggregation-Induced Emission. *ACS Nano*, 2019, 13, 839-846; Higashiguchi, et al. Photoinduced Macroscopic Morphological Transformation of an Amphiphilic Diarylethene Assembly: Reversible Dynamic Motion. *J. Am. Chem. Soc.* 2015, 137, 2722-2729).

A supramolecular cycloadduct of 9-phenylethynylanthracene has been shown to exhibit electroplex mediated white light emission (Das, et al. Supramolecular Gel Phase Controlled [4+2] Diels-Alder Photocycloaddition for Electroplex Mediated White Electroluminescence. *J. Am. Chem. Soc.* 2019, 141, 5635-5639). However, the system under reference did not exhibit any LCST or thermo-responsive behaviour.

Self-assembling properties and mechanisms have also been reported for molecules belonging to 9,10-Bis(phenylethynyl) anthracene derivatives (Lubtow et al. Self-Assembly of 9,10-Bis(phenylethynyl) Anthracene (BPEA) Derivatives: Influence of π-π and Hydrogen-Bonding Interactions on Aggregate Morphology and Self-Assembly Mechanism *Chem. Eur. J.* 2017, 23, 6198-6205). However, these molecules were not explored towards their LCST properties or thermo-responsive behaviour.

Several patents also educate the phenomenon of LCST in polymeric systems. KR2019060304A has disclosed a smart window thermotrophic composition by adjusting the LCST properties of N-iso-Pr acrylamide, N,N-methylenebis(acrylamide), ammonium persulfate and N,N,N,N-tetramethylethylenediamine in water-glycol mixture for improving energy efficiency. The LCST temperature was regulated by controlling the amount of glycol in deionized water. U.S. Pat. No. 5,430,104A proposed a blend of two different polymer mixtures, poly-α-methylstyrene (PAMs) and polyvinyl methyl ether (PVMe) as materials with a sharp temperature-dependent optical permeability. A thermally programmable co-polymer system consisting of poly(N-isopropylacrylamide), poly(N-ethylacrylamide) or poly(N,N-dimethylacryl amide) was disclosed by U.S. Pat. No. 9,550,168B2 exhibit low temperature LCST behavior leading to a hydrophobic-to-hydrophilic phase change, wherein the acid-base properties of the said system was found to be responsive to the said phase change and involved the sequestration of gaseous $CO_2$. WO2015130012A1 disclosed a temperature-dependent smart window comprising a thermoresponsive hydrogel. The smart window changed its transparency in response to temperature exposure, near its cloud point corroborating the LCST behaviour.

Thus, it can be understood from the prior arts, that there exists a dire need of small molecules exhibiting LCST behavior at ambient temperature, specifically in the range of 25-30° C., which are of high commercial significance.

OBJECTIVES OF THE INVENTION

The primary objective of the present invention is the design and applications of a class of water-soluble small molecules represented by Formula 1, capable of exhibiting lower critical solution temperature (LCST) phase transition at near room temperature, imparting a temperature triggered switching of transparency stages in solution.

Another objective of the present invention is to fabricate a scalable smart radiative energy management system that takes the form of a dynamic window that can be incorporated into the inbuilt environment for imparting energy efficiency.

SUMMARY OF THE INVENTION

The first aspect of the present invention relates to molecules of formula 1

Formula 1

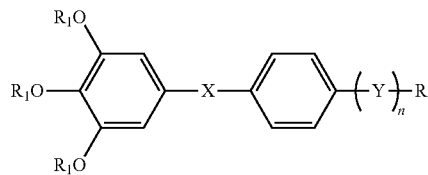

wherein, $R_1$ is independently selected from $[(CH_2)_a—O]_b—CH_3$ a is 1 or 2; b is 2-20; X is selected from HNC=O or O=CNH, —C=C—, —C≡C—; Y is selected from —N=N—, —C≡C—; n is 0 or 1; R is selected from hydrogen, halogen or $C_{6-25}$ aryl, wherein the said aryl groups may be optionally substituted with halogen, OH, CN, —O($C_1$-$C_{12}$ alkyl), —NH($C_1$-$C_{12}$ alkyl), —N($C_1$-$C_{12}$ alkyl)$_2$, —COO($C_1$-$C_{12}$ alkyl); or

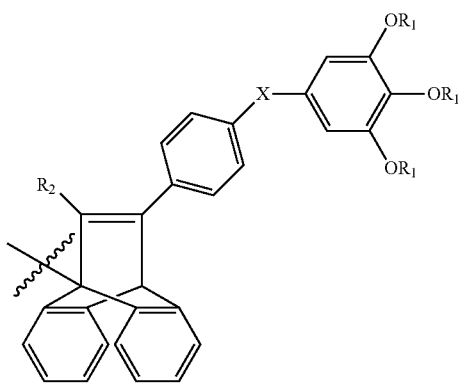

$R_2$ is selected from $C_{6-25}$ aryl, wherein the said aryl groups may be optionally substituted with halogen, OH, CN, —O($C_1$-$C_{12}$ alkyl), —NH($C_1$-$C_{12}$ alkyl), —N(($C_1$-$C_{12}$ alkyl))$_2$, —COO($C_1$-$C_{12}$ alkyl).

The second aspect of the present invention relates to a solution comprising the molecule of Formula 1, wherein R is selected from hydrogen, halogens or $C_{6-14}$ aryl and X is

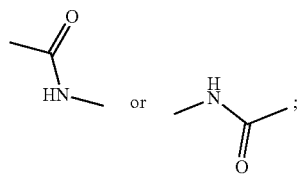

Y is —N=N— or —C≡C—; and $R_1$ is $[(CH_2)_a—O]_b—CH_3$, a is 1 or 2 and b is 8 to 12, at a concentration in the range of 0.25-5 mM in a solvent, wherein the solvent is selected from water, tetrahydrofuran(THF) or water-THF binary mixture, wherein the amount of THF is in the range of 10-20% of the total volume, the solution showing temperature tunable transparency, and the solution turns opaque above its lower critical solution temperature (LCST), the said temperature in the range of 28° C.-35° C.

The third aspect of the present invention relates to a solution of the Formula 1, wherein R is:

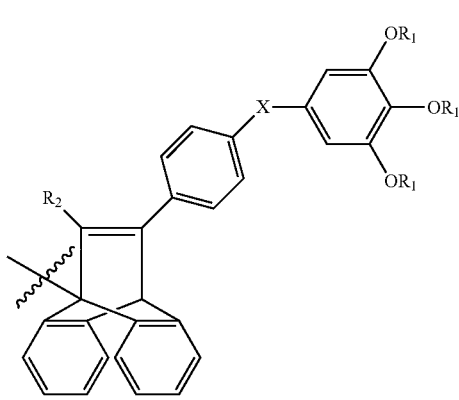

$R_2$ is $C_{6-14}$ aryl optionally substituted with halogen, OH, CN, —O($C_1$-$C_{12}$alkyl), —NH($C_1$-$C_{12}$ alkyl, —N(($C_1$-$C_{12}$alkyl))$_2$, —COO($C_1$-$C_{12}$ alkyl), X is

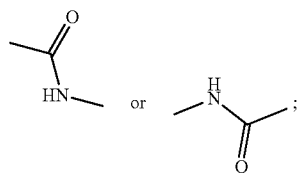

Y is —C≡C— and $R_1$ is $[(CH_2)_a—O]_b—CH_3$, a is 1 or 2, b is 8 to 12, at a concentration in the range of 0.006 mM-0.1 mM, in water or water-THF binary mixture, wherein the amount of THF is in the range of 10-20% of the total volume, said solution showing temperature tunable transparency, said solution turns opaque above its LCST, said temperature in the range of 25° C.-30° C.

The fourth aspect of the present invention relates to the molecules of formula 1 exhibiting thermo-responsive behaviour, wherein the said molecules in their aqueous solution exhibit near room temperature LCST (lower critical solution temperature) phase transition, the said solutions being able to modulate light and heat transmission via reversible switching of optical transparency.

The other aspect of the present invention relates to design and fabrication of dynamic windows by sandwiching the aqueous solution of the thermo-responsive molecules of formula 1 between two glass panes thereby allowing tunability of transparency and hence heat and light transmission via controlled LCST phase transitions triggered by controlled temperature exposure, preferably at temperatures near room temperature, more preferably in the range of 23° C.-35° C.

The yet another aspect of the present invention relates to dynamic windows fabricated by sandwiching the said solutions between two glass panes at near room temperature (25° C.-30° C.) with color tunability for efficient management and utilization of energy in a built indoor environment.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter

DETAILED DESCRIPTION OF THE INVENTION

Figure 1:
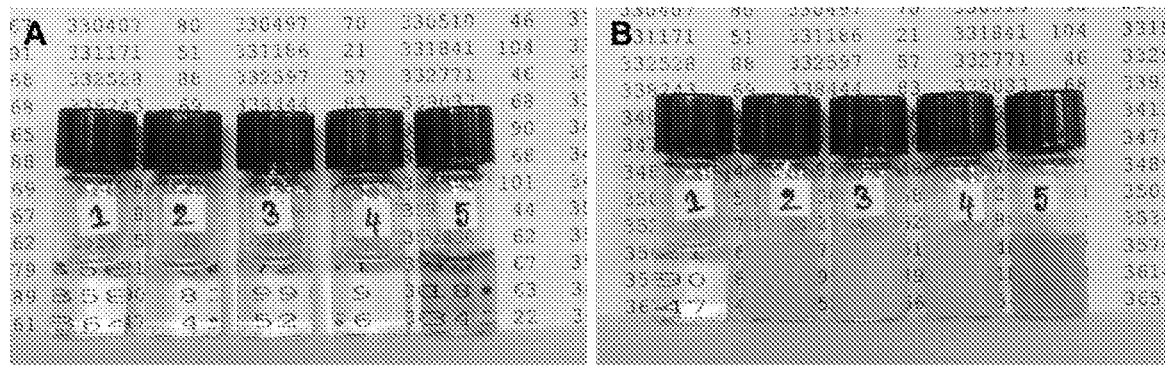
FIG. 1 (A-B) illustrates the thermo-responsive behaviour of the molecules of formula 1 (vial 1: Example 3, vial 2: Example 4, vial 3: Example 5, vial 4: Example 6 and vial 5: Example 7) at (A) temperature<LCST and (B) temperature>LCST, in accordance with an implementation of the present invention.
Figure 2:
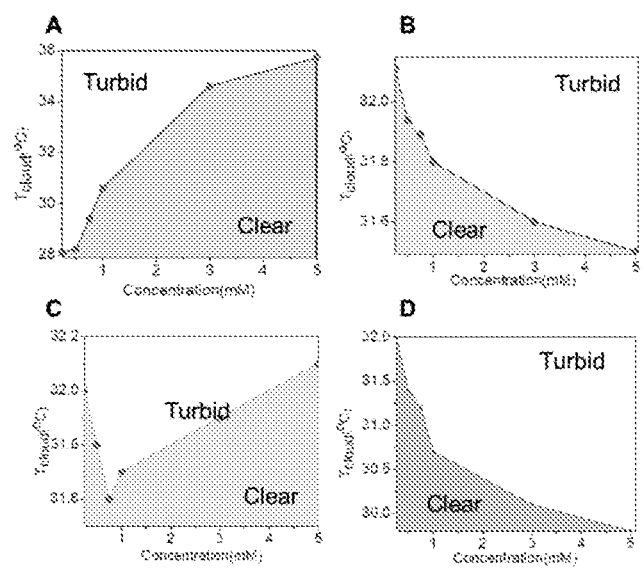
FIG. 2(A-D) illustrates the concentration-dependent variation in the clouding temperature for selected molecules of formula 1(A) Example 4, (B) Example 5, (C) Example 6, and (D) Example 7, in accordance with an implementation of the present invention.
Figure 3:
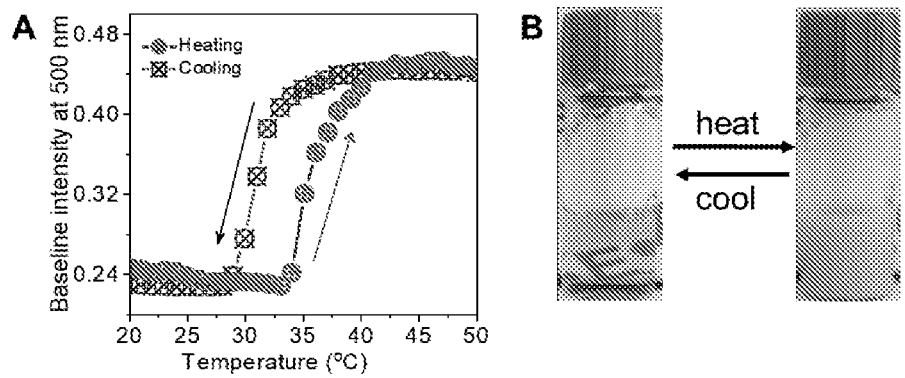
FIG. 3 (A-B) illustrates the heating-cooling hysteresis for selected molecule (Example 7) of Formula 1 (A) and photographic visualization of the clouding effect (B), in accordance with an implementation of the present invention.
Figure 4:
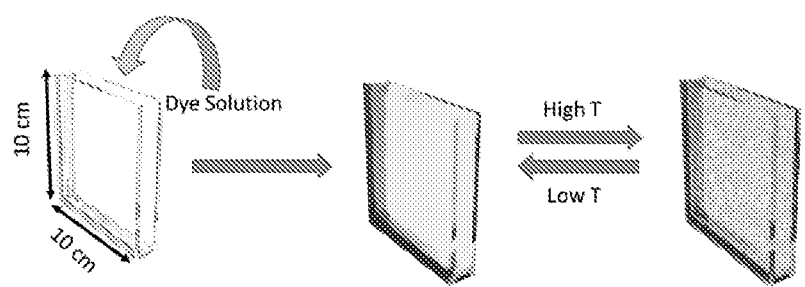
FIG. 4 illustrates the fabrication of dynamic windows using a solution of the thermo-responsive molecule of Formula 1, in accordance with an implementation of the present invention.
Figure 5:
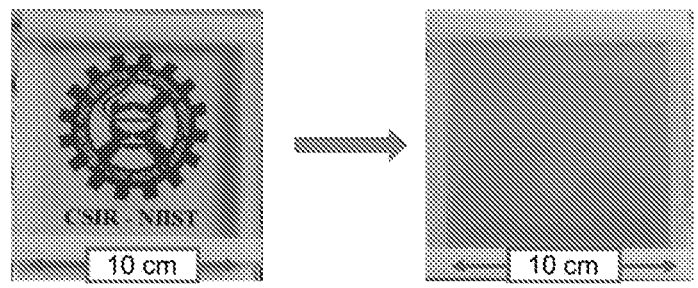
FIG. 5 illustrates the stable switched states of the dynamic window (10 cm×10 cm) fabricated using a solution of the thermo-responsive molecule of Formula 1 at temperature<LCST (left) and at temperature>LCST (right), in accordance with an implementation of the present invention.
Figure 6:
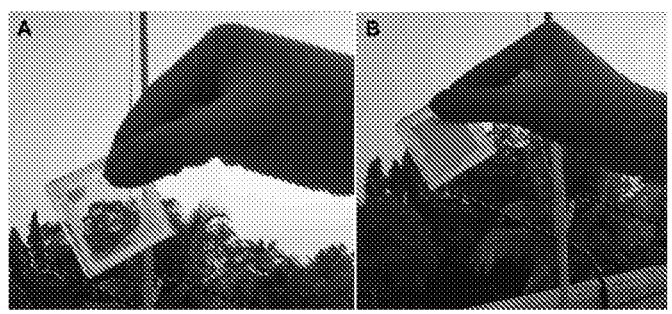
FIG. 6 illustrates the outdoor performance of the dynamic window (5 cm×5 cm) fabricated using a solution of the thermo-responsive molecule of Formula 1, at temperature<LCST (left) and at temperature>LCST (right), in accordance with an implementation of the present invention.
Figure 7:
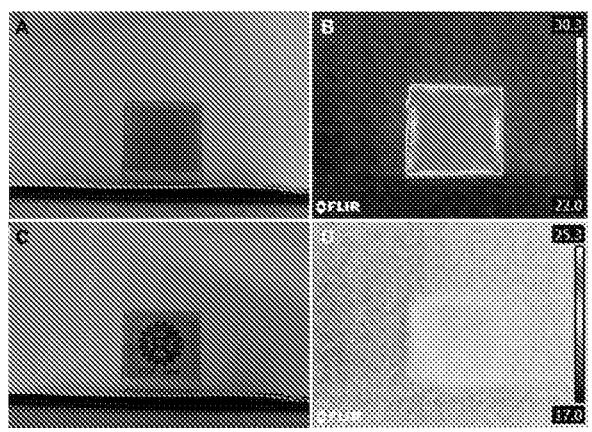
FIG. 7 illustrates the thermal imaging of the switching of the dynamic window (5 cm×5 cm) fabricated using a solution of the thermo-responsive molecule of Formula 1, at temperature<LCST (bottom) and at temperature>LCST (top), in accordance with an implementation of the present invention.
Figure 8:
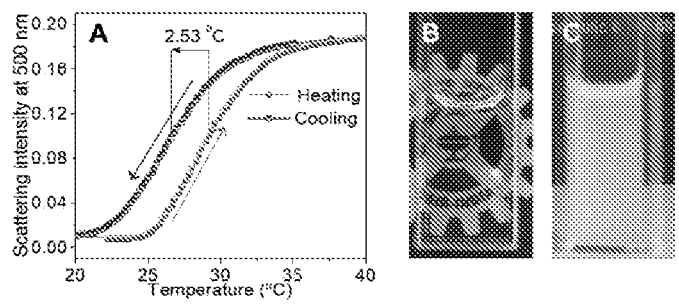
FIG. 8 illustrates the heating-cooling hysteresis for selected molecule (Example 9) of Formula 1 (A) and photographic visualization of the clouding effect (B-C), in accordance with an implementation of the present invention.
Figure 9:
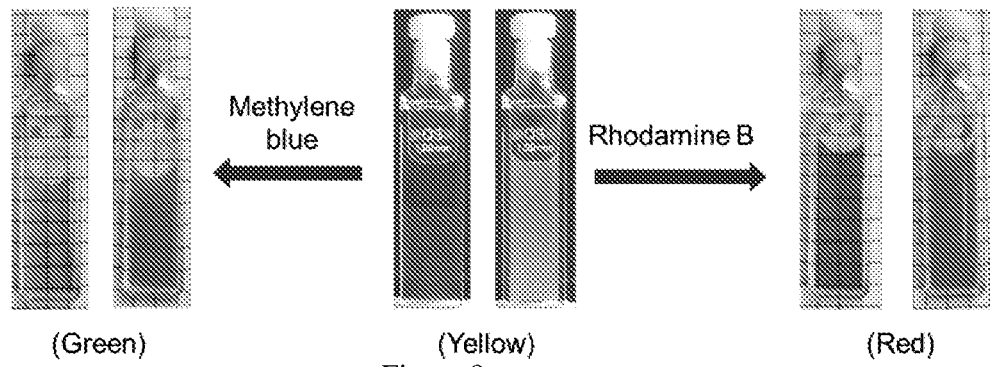
FIG. 9 illustrates the colour tunability of a solution of molecule of Formula 1 by addition of water-soluble dyes, in accordance with an implementation of the present invention.
Figure 10:
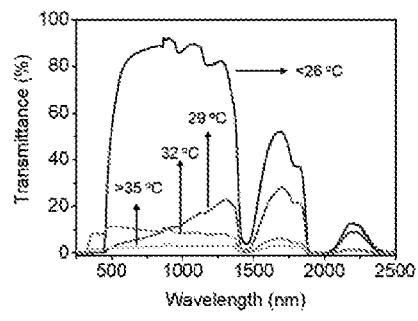
FIG. 10 illustrates the modulation of heat transmission (NIR-IR transmission) in the transparent (<26° C.) and opaque (>32° C.) states for a dynamic window fabricated from a molecule of Formula 1, in accordance with an implementation of the present invention.
Figure 11:
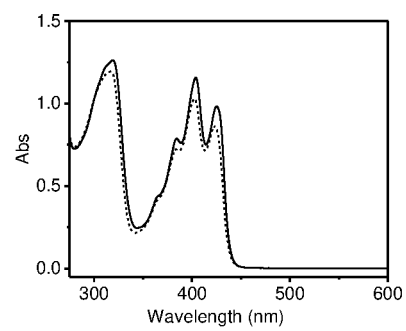
FIG. 11 illustrates the UV-Vis spectra of the molecule of general formula 1 featuring alkyl chains (as presented in Das, et al. Supramolecular Gel Phase Controlled [4+2] Diels-Alder Photocycloaddition for Electroplex Mediated White Electroluminescence. *J. Am. Chem. Soc.* 2019, 141, 5635-5639) in place of the glycol chains (as disclosed in the present invention) below room temperature (~20° C., solid line) and at high temperature (~70° C., dashed line), confirming the non-thermo-responsive nature of molecules reported in previous publication.

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only". Throughout this specification, unless the context requires otherwise the word "comprise", and variations such as "comprises" and "comprising", will be understood to imply the inclusion of a stated element or step or group of element or steps but not the exclusion of any other element or step or group of element or steps.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature in the range of 23-35° C. should be interpreted to include not only the explicitly recited limits of about 23° C. to about 35° C. but also to include sub-ranges, such as 24-34° C., and so forth, as well as individual amounts, within the specified ranges, such as 28.2° C., and 30.5° C.

The term "thermo-responsive molecule" refers to a molecule or a chemical substance which exhibits change in its physical property with change in temperature. In the present disclosure, the molecule of Formula 1 is a thermo-responsive molecule which in their aqueous solutions change their opacity in correlation with applied/environmental temperature (LCST), turn opaque above their LCST temperature and attain transparency below LCST as disclosed herein.

The term "dynamic window" refers to the window which can exhibit color change based on the environment/temperature change. In the present disclosure, the dynamic window refers to the windows obtained by sandwiching a solution of molecule of Formula 1 in between the two glass panes/plates and the molecule of Formula 1 is a thermo-responsive molecule as disclosed herein.

The term "temperature tunable transparency" refers to the property exhibited by the molecule of Formula 1, which can turn opaque or transparent based on the change in the temperature.

The term "lower critical solution temperature (LCST)" refers to the temperature below and above which the solution of thermo-responsive molecule exhibits the change in its physical property. In the present disclosure, LCST refers to the temperature above and below which the solution switches between being opaque and transparent. In particular, the solution turn opaque above their LCST temperature and attain transparency below the said critical temperature as disclosed herein.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally-equivalent molecules, compositions, and methods are clearly within the scope of the disclosure, as described herein.

In an embodiment of the present invention the molecules of Formula 1 exhibit thermo-responsive behaviour, wherein the said molecules in their aqueous solution exhibit near room temperature LCST (lower critical solution temperature) phase transition, the said solutions being able to modulate light and heat transmission via reversible switching of optical transparency.

Another embodiment of the present invention relates to design and fabrication of dynamic windows by sandwiching the aqueous solution of the thermo-responsive molecules of Formula 1 between two glass panes thereby allowing tunability of transparency and hence heat and light transmission via controlled LCST phase transitions triggered by controlled temperature exposure, preferably at temperatures near room temperature, more preferably in the range of 23° C.-35° C.

In yet another embodiment the present invention relates to dynamic windows fabricated by sandwiching the said solutions between two glass panes at near room temperature (25° C.-30° C.) with color tunability for efficient management and utilization of energy in a built indoor environment.

The present invention relates to the design and synthesis of a class of molecules with Formula 1, which in their aqueous solutions change their opacity in correlation with applied/environmental temperature, a property known as LCST (lower critical solution temperature), the said solutions turn opaque above their LCST temperature and attain transparency below the said critical temperature as described above.

The present disclosure provides a class of thermo-responsive molecules of Formula 1, wherein the said molecules in their aqueous solution exhibit near room temperature LCST (lower critical solution temperature) phase transition, the said solutions being able to modulate light and heat transmission via reversible switching of optical transparency. LCST, also referred to as the lower consolute temperature is defined as that critical temperature below which the components are completely miscible for mixture at all possible compositions. Partial or no miscibility above LCST results in increasing opacity for such systems. The terms opacity and transparency mentioned hereafter refer to quantified absorption/transmission of light through the solution of such systems, the said light being ambient or produced from a source at the time of interest. The present disclosure provides a design and fabrication of dynamic windows by sandwiching the aqueous solution of the said thermo-responsive molecules of Formula 1 between two glass panes. Controlled LCST phase transitions triggered by controlled temperature exposure, preferably at temperatures near room temperature, more preferably in the range of 23° C.-35° C., thereby allowing tunability of transparency/opacity and hence heat and light transmission for energy efficiency in the indoor environment.

Sandwiching the said solutions between two glass panes renders a yellow color in light transmission mode and an opaque yellow shade with almost complete blockage of light above 30° C. A dynamic window fabricated from the said solution, wherein the sandwiched solution is transparent to the naked eye below 30° C. and opaque above 30° C., provides a switching system between clear yellow and opaque yellow, thereby allowing controlled transmission of light through the said dynamic window.

The present disclosure also provides that the temperature of switching the transparency can be tuned to a lower range, preferably close to room temperature, more preferably between 23° C. and 27° C. via chemical modification of the molecules of Formula 1. In certain specific embodiments, the present invention renders color tuning of the aforesaid dynamic window via chemical modification of the molecules of Formula 1 whereby, the aforesaid chemical modification allows colorless light/heat transmitting dynamic windows at lower temperature, preferably below 25° C. and opaque-white light-blocking dynamic windows at temperature preferably above 25° C.

Another aspect of the present invention is to develop stable dynamic windows using a green solvent, preferably water, wherein complete sealing of the said window from environmental wear and tear, thereby fatigue-free switching is possible over multiple cycles.

Further, the invention intends to provide a strategy for energy efficiency in the indoor environment via dynamic modulation of heat and light transmission, wherein the temperature-dependent transparency of the said dynamic window directly correlates to the amount of energy required for indoor lighting and maintaining indoor temperature. The controlled heat/light transmission through the said dynamic windows leading to magnanimous reduction of indoor energy consumption thereby provides access to smart energy management and utilization systems.

In an embodiment of the present disclosure there is provided a molecule of Formula 1,

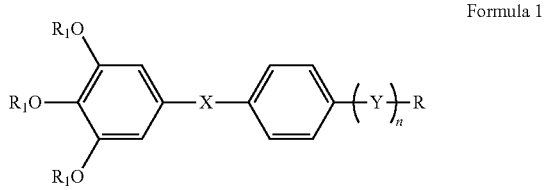

Formula 1 wherein, $R_1$ is independently selected from $[(CH_2)_a—O]_b—CH_3$ wherein, a is 1 or 2; b is 2 to 20;

X is selected from

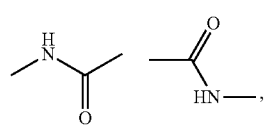

—C=C—, and —C≡C—; Y is —N=N—, or —C≡C—; n is 0 or 1; R is selected from hydrogen, halogens or $C_{6-25}$ aryl, wherein the said aryl may be optionally substituted with halogen, OH, CN, —O($C_1$-$C_{30}$ alkyl chain), —(NH)$_{1-2}$($C_1$-$C_{30}$ alkyl chain), —N($C_1$-$C_{30}$ alkyl chain)$_2$, —COOH, —COO($C_1$-$C_{30}$ alkyl chain); or

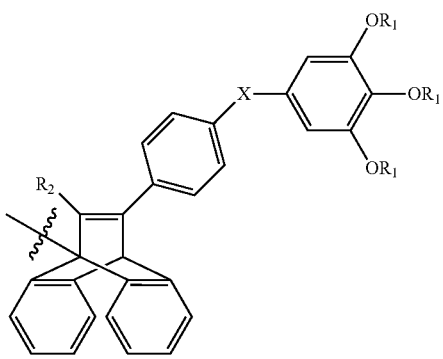

$R_2$ is selected from $C_{6-25}$ aryl wherein the said aryl may be optionally substituted with halogen, OH, CN, —O($C_1$-$C_{30}$ alkyl), —(NH)$_{1-2}$($C_1$-$C_{30}$ alkyl), —N($C_1$-$C_{30}$ alkyl)$_2$, COOH, —COO($C_1$-$C_{30}$ alkyl).

In an embodiment of the present disclosure there is provided a molecule of Formula 1,

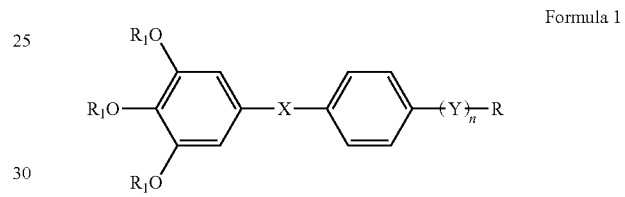

Formula 1 wherein, $R_1$ is independently selected from $[(CH_2)_a—O]_b—CH_3$ wherein a is 1 or 2; b is 2 to 20;

X is selected from

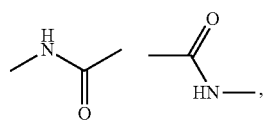

—C=C—, and —C≡C—; Y is —N=N—, or —C≡C—; n is 0 or 1; R is selected from hydrogen, h halogen or $C_{6-25}$ aryl, said aryl comprises of a single or multiple fused rings, wherein the number of rings is 1-5 (benzene to pentacene) and optionally substituted with halogen, OH, CN, —O($C_1$-$C_{30}$ alkyl), —(NH)$_{1-2}$($C_1$-$C_{30}$ alkyl), —N($C_1$-$C_{30}$ alkyl)$_2$, COOH, —COO($C_1$-$C_{30}$ alkyl); or

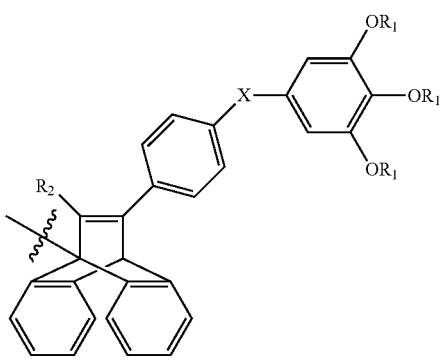

$R_2$ is selected from $C_{6-25}$ aryl, said aryl comprises of single or multiple fused rings, wherein the number of rings is 1-5 (benzene to pentacene) and optionally substituted with halogen, OH, CN, —O($C_1$-$C_{30}$ alkyl), —(NH)$_{1-2}$($C_1$-$C_{30}$ alkyl), —N($C_1$-$C_{30}$ alkyl)$_2$, COOH, —COO($C_1$-$C_{30}$ alkyl).

In an embodiment of the present disclosure, there is provided the molecule of Formula 1 as disclosed herein, wherein $R_1$ is [($CH_2$)$_a$—O]$_b$—$CH_3$, a is 1 or 2 and b is 2 to 20. In another embodiment of the present disclosure, wherein a is 1 and b is 2 to 20. In yet another embodiment of the present disclosure, wherein a is 2 and b is 2 to 20.

In an embodiment of the present disclosure, there is provided the molecule of Formula 1 as disclosed herein, wherein $R_1$ is [($CH_2$)$_a$—O]$_b$—$CH_3$, a is 1 or 2 and b is 2 to 18. In another embodiment of the present disclosure, there is provided the molecule of Formula 1 as disclosed herein, wherein $R_1$ is [($CH_2$)$_a$—O]$_b$—$CH_3$, a is 1 or 2 and b is 2 to 15.

In an embodiment of the present disclosure, there is provided the molecule of Formula 1 as disclosed herein, wherein $R_1$ is [($CH_2$)$_a$—O]$_b$—$CH_3$, a is 1 or 2 and b is 8 to 12.

In an embodiment of the present disclosure, there is provided the molecule of Formula 1 as disclosed herein, wherein X is

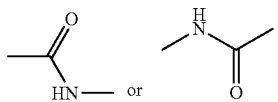

and Y is —N=N— or —C≡C—.

In an embodiment of the present disclosure, there is provided the molecule of Formula 1 as disclosed herein, wherein R is selected from hydrogen, halogen, $C_{6-14}$ aryl, said aryl is optionally substituted with halogen, OH, CN, —O($C_1$-$C_{12}$ alkyl), —NH($C_1$-$C_{12}$ alkyl), —N($C_1$-$C_{12}$ alkyl)$_2$, —COO($C_1$-$C_{12}$ alkyl); or

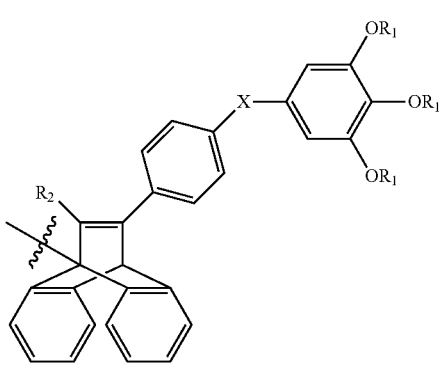

and $R_2$ is selected from $C_{6-14}$ aryl, wherein the said aryl optionally substituted with halogen, OH, CN, O($C_1$-$C_{12}$ alkyl), —NH($C_1$-$C_{12}$ alkyl), —N($C_1$-$C_{12}$ alkyl)$_2$, —COO($C_1$-$C_{12}$ alkyl).

In an embodiment of the present disclosure, there is provided the molecule of Formula 1 as disclosed herein, wherein R is selected from hydrogen, halogen, $C_{6-14}$ aryl, said aryl comprises of a single or multiple fused rings, wherein the number of rings is 1-3 (benzene to anthracene) and is optionally substituted with halogen, OH, CN, —O($C_1$-$C_{12}$ alkyl), —NH($C_1$-$C_{12}$ alkyl), —N($C_1$-$C_{12}$ alkyl)$_2$, —COO($C_1$-$C_{12}$ alkyl); or

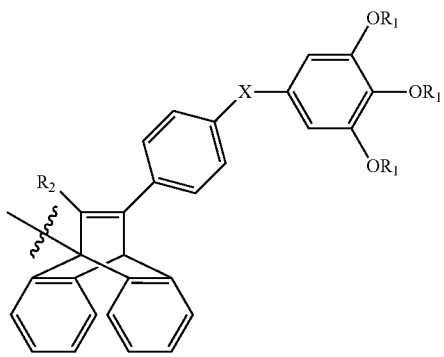

and $R_2$ is selected from $C_{6-14}$ aryl, said aryl comprises of a single or multiple fused rings, wherein the number of rings is 1-3 (benzene to anthracene) and optionally substituted with halogen, OH, CN, O($C_1$-$C_{12}$ alkyl), —NH($C_1$-$C_{12}$ alkyl), —N($C_1$-$C_{12}$ alkyl)$_2$, —COO($C_1$-$C_{12}$ alkyl).

In an embodiment of the present disclosure, there is provided the molecule of Formula 1 as disclosed herein, wherein $R_1$ is [($CH_2$)$_a$—O]$_b$—$CH_3$, a is 1 or 2, b is 2 to 20, X is

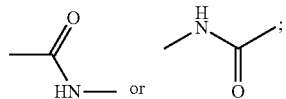;

Y is —N=N— or —C≡C— and R is selected from hydrogen, halogen, $C_{6-14}$ aryl, said aryl is optionally substituted with halogen, OH, CN, —O($C_1$-$C_{12}$ alkyl), —NH($C_1$-$C_{12}$ alkyl), —N($C_1$-$C_{12}$ alkyl)$_2$, —COO($C_1$-$C_{12}$ alkyl); or

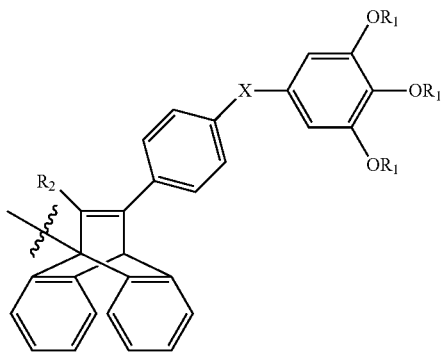

and $R_2$ is selected from $C_{6-14}$ aryl optionally substituted with halogen, OH, CN, —O($C_1$-$C_{12}$ alkyl), —NH($C_1$-$C_{12}$ alkyl), —N($C_1$-$C_{12}$ alkyl)$_2$, —COO($C_1$-$C_{12}$ alkyl).

In an embodiment of the present disclosure, there is provided the molecule of Formula 1 as disclosed herein, wherein the Formula 1 is selected from a) 3,4,5-tris(2-(2-(2-methoxyethoxy)ethoxy)ethoxy)-N-phenyl benzamide, b) N-(4-iodophenyl)-3,4,5-tris(2-(2-methoxyethoxy)ethoxy) benzamide, c) 3,4,5-tris(2-(2-methoxyethoxy)ethoxy)-N-(4-(phenyl ethynyl)phenyl)benzamide, d)3,4,5-tris(2-(2-methoxyethoxy)ethoxy)-N-(4-(naphthalen-1-ylethynyl) phenyl)benzamide, e)N-(4-(anthracen-9-ylethynyl)phenyl)-3,4,5-tris(2-(2-methoxyethoxy)ethoxy)benzamide, f) (E)-3,4,5-tris(2-(2-(2-methoxyethoxy) ethoxy) ethoxy)-N-(4(phenyldiazenyl) phenyl) benzamide, and g) N-(4-((12-(anthracen-9-yl)-11-(4-(3,4,5-tris(2-(2-(2-methoxy ethoxy) ethoxy) ethoxy) benzamido) phenyl)-9,10-ethenoanthracen-9 (10H)-yl) ethynyl) phenyl) -3,4,5-tris(2-(2-(2-methoxyethoxy) ethoxy) ethoxy) benzamide.

In an embodiment of the present disclosure, there is provided a solution comprising the molecule of Formula 1 at a concentration range of 0.25-5 mM in a solvent and wherein the solvent is selected from water, tetrahydrofuran, or binary mixture of water and tetrahydrofuran (THF) having tetrahydrofuran amount in the range of 10-20% of the total volume of the solvent, the solution showing temperature tunable transparency, and the solution turns opaque above its lower critical solution temperature (LCST)said temperature in the range of 23° C.-35° C.

In an embodiment of the present disclosure, there is provided a solution of Formula 1, wherein R is independently selected from hydrogen, halogen or aryl, wherein the said aryl comprises of a single or multiple fused rings, wherein the number of rings is 1-3 (benzene to anthracene), and $R_1$ is $[(CH_2)_a—O]_b—CH_3$, a is 1 or 2, b is 8 to 12, X is

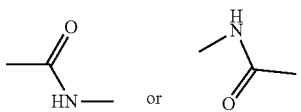

and Y is —N=N— or —C≡C—, at concentration ranging from 0.25-5 mM in water or water-THF binary mixture, wherein the amount of THF is in the range of 10-20% of the total volume, the said solution showing temperature tunable transparency, wherein the said solution turns opaque above its lower critical solution temperature (LCST), the said temperature in the range of 28° C.-35° C.

In an embodiment of the present disclosure, there is provided a solution of Formula 1, wherein the concentration of the molecule is in the range of 1 to 5 mM and temperature tunable transparency in the range of 28° C.-32° C.

In an embodiment of the present disclosure, there is provided a solution of Formula 1, wherein R is:

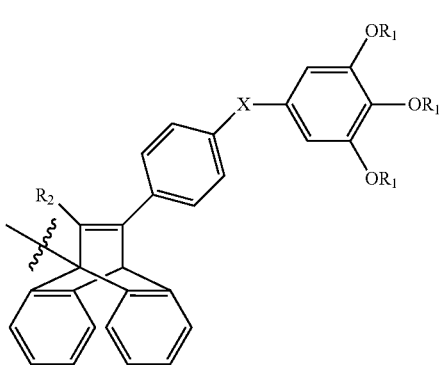

$R_2$ is $C_{6-14}$ aryl, wherein the said aryl optionally substituted with halogen, OH, CN, —O($C_1$-$C_{12}$ alkyl), —NH($C_1$-$C_{12}$ alkyl), —N(($C_1$-$C_{12}$ alkyl))$_2$, —COO($C_1$-$C_{12}$ alkyl), X is

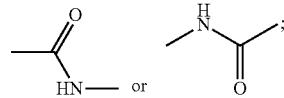

Y is —C≡C— and $R_1$ is $[(CH_2)_a—O]_b—CH_3$, a is 1 or 2, b is 8 to 12, at a concentration in the range of 0.006 mM-0.1 mM, in water or water-THF binary mixture, wherein the amount of THF is in the range of 10-20% of the total volume, said solution showing temperature tunable transparency, said solution turns opaque above its LCST, said temperature in the range of 25° C.-30° C.

In an embodiment of the present disclosure, there is provided a solution of Formula 1, wherein the concentration of the Formula 1 is in the range of 0.025-0.1 mM and temperature tunable transparency is in the range of 25° C.-27° C.

In an embodiment of the present disclosure, there is provided a dynamic window fabricated by sandwiching the solutions of the Formula 1 between two glass panes, thereby allowing tunability of transparency via controlled LCST phase transitions triggered by controlled temperature exposure at temperatures near room temperature in the range of 25° C.-35° C.

In an embodiment of the present disclosure, there is provided the dynamic window as disclosed herein, wherein the dynamic window render light and/or dark yellow and/or orange color in light transmission mode and opaque yellow and/or orange shade above 30° C.

In an embodiment of the present disclosure, there is provided the dynamic window as disclosed herein, wherein the dynamic window have color tunability spanning the RGB color space via controlled addition of water-soluble dyes at defined weight compositions in the range of 1:100 to 1:1000 (dye: Formula 1), wherein the dye is selected from methylene blue, rhodamine B, nile blue, methyl orange, malachite green, rose Bengal, or combinations thereof.

In an embodiment of the present disclosure, there is provided the dynamic window as disclosed herein, wherein the dynamic window is utilized for energy-efficient buildings in indoor environments and result in a decrease of indoor temperature in the range of 3° C. to 5° C.

In an embodiment of the present disclosure, there is provided the dynamic windows as disclosed herein, wherein the window is utilized for energy-efficient buildings preferably in indoor environment and result in a decrease of indoor temperature by 3° C., more preferably by 5° C.

In an embodiment of the present disclosure, there is provided a dynamic window which can render color tunability via the controlled addition of water-soluble dyes at defined weight compositions, thereby the said dynamic windows may be chosen based on aesthetic considerations of an end-user or demand of the preferred application. Addition of the said dyes in fixed weight percentages, wherein the dyes do not interfere with the LCST switching phenomenon, except for changes in color, thereby allows access to generation of multi-colored LCST switching of optical transparency. Furthermore, the invention also provides tuning of the switching temperature of the said dynamic windows, depending on the choice of the dye and its weight composition, thereby optical switching is made possible at controlled temperature exposure.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

LIST OF ABBREVIATIONS USED

LCST—Lower Critical Solution Temperature
$CO_2$—Carbon dioxide
cm—centimeter
RB—Round Bottom
mL—Milliliters
NMR—Nuclear Magnetic Resonance
Hz—Hertz
MHz—Megahertz
THF—Tetrahydrofuran EXAMPLES The disclosure will now be illustrated with the working examples, which is intended to illustrate the working of disclosure and not intended to take restrictively to imply any limitations on the scope of the present disclosure. Unless defined otherwise, all technical and scientific terms used herein have the same meaning as commonly understood to one ordinary person skilled in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

EXAMPLES

Example 1. Synthesis of 3,4,5-tris(2-(2-methoxyethoxy)ethoxy) benzoic acid

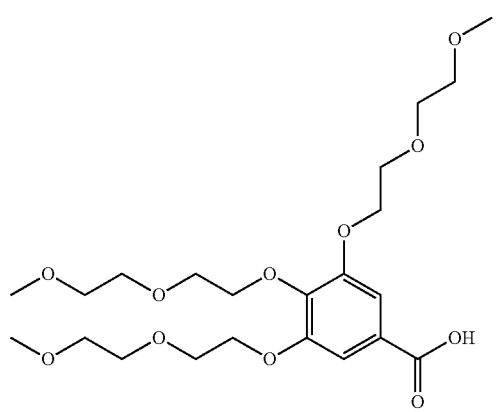

NaOH (1.022 g) dissolved in distilled EtOH (75 mL) was added to methyl 3,4,5-tris(2-(2-methoxyethoxy)ethoxy)benzoate (16 g, 25.72 mmol) in an RB flask. The reaction mixture was heated at 80° C. for 12 h and was then cooled to room temperature. The solvent was evaporated under reduced pressure and the residue obtained was washed with 10% HCl and extracted using chloroform (200 mL). The organic layer was washed with brine, dried over anhydrous $Na_2SO_4$ and the solvent was evaporated under reduced pressure. The product thus obtained was used in the next step without further purification. Yield: 90%; $^1$H NMR (500 MHz, $CDCl_3$): δ=7.33 (s, 2H), 4.26-4.19 (m, 6H), 3.89-3.81 (m, 6H), 3.76-3.72 (m, 6H), 3.69-3.63 (m, 12H), 3.57-3.54 (m, 6H), 3.38 (s, 9H) ppm; HRMS: [M+Na]$^+$ calcd. for $C_{28}H_{48}O_{14}Na$, 631.67; found, 631.62.

Example 2. Synthesis of 3,4,5-tris(2-(2-methoxyethoxy)ethoxy) benzoyl chloride

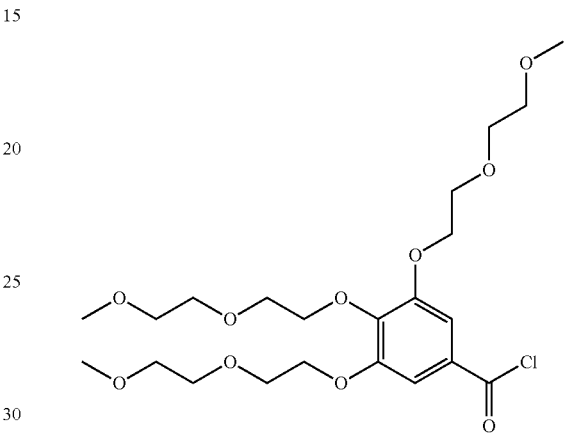

To a mixture of 3,4,5-tris(2-(2-methoxyethoxy)ethoxy) benzoic acid (8 g, 13.2 mmol) and $CH_2Cl_2$ (dry, 20 mL) under nitrogen atmosphere, $SOCl_2$ (0.5 g, 4.23 mmol) was added dropwise using a syringe. The reaction mixture was allowed to stir at room temperature for 5 h and the solvent and unreacted $SOCl_2$ were removed under a flow of nitrogen. The residue thus obtained was used in the next step without purification and characterization.

Example 3. Synthesis of 3,4,5-tris(2-(2-(2-methoxyethoxy)ethoxy)ethoxy)-N-phenyl benzamide

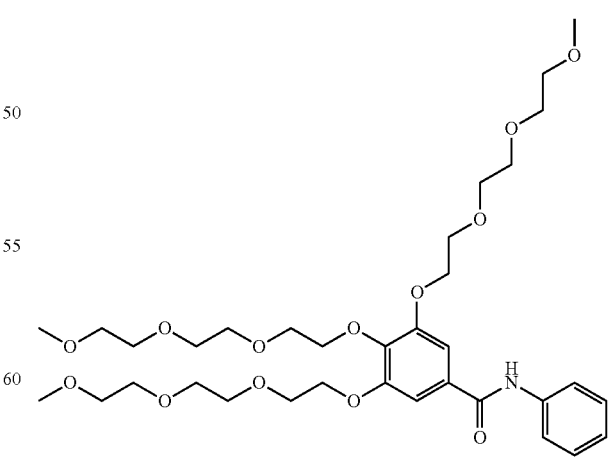

Aniline (0.49 g) was dissolved in dry toluene (20 mL) in a two-neck round bottom flask under nitrogen. Dry triethylamine (2 mL) was added to the flask and allowed the reaction mixture to stir at room temperature for 15 min. 3,4,5-tris(2-(2-(2-methoxyethoxy) ethoxy) ethoxy) benzoyl chloride (3 g) dissolved in dry toluene (10 mL) was added dropwise. The reaction mixture was allowed to stir at room temperature for 12 h. Toluene was evaporated and the residue was extracted using chloroform. The organic layer was washed with water and brine and dried over anhydrous sodium sulphate. After concentration in vacuo, the residue was purified by silica gel column chromatography using 2% ethylacetate/hexane as an eluent. Yield: 75%; $^1$H NMR (300 MHz, CDCl$_3$): δ=8.5 (s, 1H), 7.67 (d, 2H), 7.35 (t, 2H), 7.24 (s, 2H), 7.17 (t, 1H), 4.31-4.14 (t, 6H), 3.85-3.87 (t, 6H), 3.54-3.56 (m, 48H), 3.37 (s, 9H) ppm; HRMS-FAB (m/z): [M+H]$^+$ calcd. for C$_{42}$H$_{57}$NO$_{13}$, 683.354; found, 683.344.

Example 4. Synthesis of N-(4-iodophenyl)-3,4,5-tris(2-(2-methoxyethoxy)ethoxy) benzamide

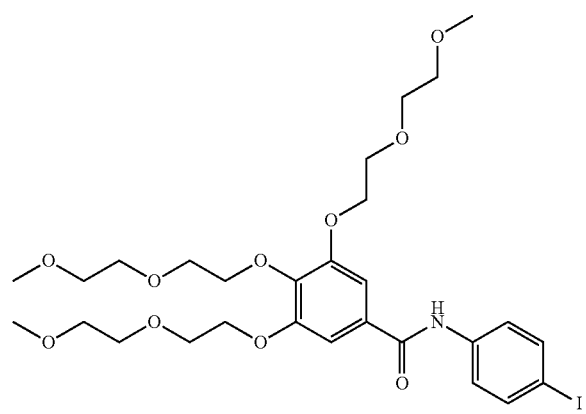 [SMILES: COCCOCCOc1cc(C(=O)Nc2ccc(I)cc2)cc(OCCOCCOC)c1OCCOCCOC]

To a solution of 4-Iodoaniline (8.2632 g, 13.2 mmol) in toluene (dry, 20 mL) under nitrogen atmosphere, triethylamine (dry, 2.0 mL) was added and the reaction mixture was stirred at room temperature for 15 min. 3,4,5-tris(2-(2-methoxyethoxy)ethoxy) benzoyl chloride obtained in Example 3 dissolved toluene (dry, 10 mL) was added dropwise to the stirred reaction mixture. Stirring was continued for another for 12 h at room temperature. The solvent was evaporated and the obtained residue was extracted using chloroform (50 mL). The organic layer was washed with brine, dried over anhydrous Na$_2$SO$_4$ and concentrated in vacuo. The residue was purified by column chromatography on silica gel using 5% MeOH in CHCl$_3$ as eluent. Yield: 75%; $^1$H NMR (500 MHz, CDCl$_3$): δ=8.74 (s, 1H), 7.64 (d, J=8.5 Hz, 2H), 7.51 (d, J=9.0 Hz, 2H), 7.22 (s, 2H), 4.21-4.19 (m, 6H), 3.83-3.79 (m, 6H), 3.76-3.72 (m, 6H), 3.69-3.63 (m, 12H), 3.53-3.50 (m, 6H), 3.37 (s, 3H), 3.32 (s, 6H) ppm; 13C NMR (125 MHz, CDCl$_3$): δ=58.96, 68.97, 69.71, 70.38, 70.46, 70.56, 70.60, 71.83, 87.39,107.61, 122.58, 129.72, 137.66, 138.45, 141.68, 152.37, 165.74 ppm; HRMS (m/z): [M+Na]$^+$ calcd. for C$_{34}$H$_{52}$INO$_{13}$Na, 832.25; found, 832.75.

Example 5. Synthesis of 3,4,5-tris(2-(2-methoxyethoxy)ethoxy)-N-(4-(phenyl ethynyl)phenyl)benzamide

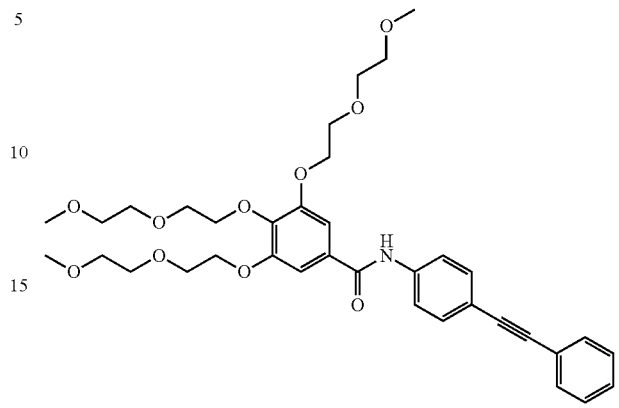

The title compound was synthesized via a palladium catalyzed Sonogashira-Hagihara cross coupling reaction. To a two neck round bottom flask sealed with a rubber septum and charged with a degassed mixture of trimethylamine (10 mL) and THF (10 mL), N-(4-iodophenyl)-3,4,5-tris(2-(2-methoxyethoxy)ethoxy) benzamide (0.150 g, 0.17 mmol), Pd(PPh$_3$)$_2$Cl$_2$ (0.012 g, 0.017 mmol) and CuI (0.0032 g, 0.017 mmol) were added and purged with argon. Phenyl acetylene (0.094 g, 0.19 mmol) was then added to the reaction mixture and stirred at room temperature under argon atmosphere for 12 h. CHCl$_3$ (50 mL) was added to the reaction mixture and followed by 10% HCl to neutralize excess triethylamine. The organic layer was separated and washed with brine and then dried over anhydrous Na$_2$SO$_4$ and the solvent was evaporated under reduced pressure. The crude was purified by column chromatography on silica gel using 5% MeOH in CHCl$_3$ as eluent. Yield: 72%; $^1$H NMR (500 MHz, CDCl$_3$): δ=7.67 (d, 4H, J=10), 7.47 (m, 8H), 7.39 (t, 1H, J=10), 7.29 (m, 7H), 7.22 (m, 4H), 4.17 (m, 13H), 3.78 (m, 14H), 3.65 (m, 14H), 3.60 (m, 27H), 3.48 (m, 13H), 3.30 (s, 6H), 3.26 (s, 12H) ppm; $^{13}$C NMR (125 MHz, CDCl$_3$): δ=59.02, 69.85,70.38, 70.50, 70.55, 70.58, 70.65, 71.88, 76.80, 77.06, 77.31, 89.37, 108.05, 118.69, 120.10, 123.39, 128.14, 128.35, 128.41, 131.54, 132.30, 138.67, 141.97, 152.49, 165.53 ppm; HRMS (m/z): [M+Na]$^+$ calcd. for C$_{42}$H$_{57}$NO$_{13}$Na, 806.38; found, 806.37.

Example 6. Synthesis of 3,4,5-tris(2-(2-methoxyethoxy)ethoxy)-N-(4-(naphthalen-1-ylethynyl)phenyl)benzamide

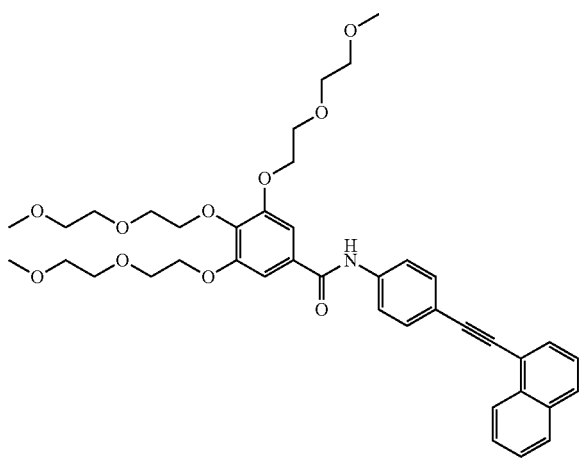 [SMILES: COCCOCCOc1cc(C(=O)Nc2ccc(C#Cc3cccc4ccccc34)cc2)cc(OCCOCCOC)c1OCCOCCOC]

The title compound was synthesized via a palladium catalyzed Sonogashira-Hagihara cross coupling reaction. To a two neck round bottom flask sealed with a rubber septum and charged with a degassed mixture of trimethylamine (10 mL) and THF (10 mL), N-(4-iodophenyl)-3,4,5-tris(2-(2-methoxyethoxy)ethoxy) benzamide (0.160 g, 0.17 mmol), Pd(PPh$_3$)$_2$Cl$_2$ (0.012 g, 0.017 mmol) and CuI (0.0032 g, 0.017 mmol) were added and purged with argon. 1-ethynylnaphthalene (0.1 g, 0.19 mmol) was then added to the reaction mixture and stirred at room temperature under argon atmosphere for 12 h. CHCl$_3$ (50 mL) was added to the reaction mixture and followed by 10% HCl to neutralize excess triethylamine. The organic layer was separated and washed with brine and then dried over anhydrous Na$_2$SO$_4$ and the solvent was evaporated under reduced pressure. The crude was purified by column chromatography on silica gel using 5% MeOH in CHCl$_3$ as eluent. Yield=50%. $^1$H NMR (500 MHz, CDCl$_3$): δ=8.67 (s, 1H), 7.98 (s 1H), 7.763-7.731 (m, 2H), 7.679-7.662 (d, 2H), 7.576-7.559 (d, 1H), 7.501 (2H), 7.423 (m, 2H), 7.155 (s, 2H), 4.17-4.14 (m, 6H), 3.78-3.70 (m, 6H), 3.604-5.574 (m, 21H), 3.48 (br s, 6H), 3.33-3.24 (m, 9H). $^{13}$C NMR (125 MHz, CDCl$_3$): δ=165.45, 152.56, 142.13, 137.79, 133.06, 132.75, 132.37, 131.29, 128.40, 127.98, 127.98, 127.76, 126.59, 126.52, 122.33, 120.08, 72.41, 71.95, 71.90, 71.89, 70.68, 70.64, 70.60, 70.58, 70.53, 70.52, 70.42, 70.39, 69.85, 69.28, 58.99, 58.93, 58.91.

Example 7. Synthesis of N-(4-(anthracen-9-ylethynyl)phenyl)-3,4,5-tris(2-(2-methoxyethoxy)ethoxy) benzamide The title compound was synthesized via a palladium catalyzed Sonogashira-Hagihara cross coupling reaction. To a two neck round bottom flask sealed with a rubber septum and charged with a degassed mixture of trimethylamine (10 mL) and THF (10 mL), N-(4-iodophenyl)-3,4,5-tris(2-(2-methoxyethoxy)ethoxy) benzamide (0.160 g, 0.17 mmol), Pd(PPh$_3$)$_2$Cl$_2$ (0.012 g, 0.017 mmol) and CuI (0.0032 g, 0.017 mmol) were added and purged with argon. 9-ethynylanthracene (0.037 g, 0.187 mmol) dissolved in degassed THF-triethylamine (1:1, 10 mL) was then added to the reaction mixture and stirred at room temperature under argon atmosphere for 12 h. CHCl$_3$ (50 mL) was added to the reaction mixture and followed by 10% HCl to neutralize excess triethylamine. The organic layer was separated and washed with brine and then dried over anhydrous Na$_2$SO$_4$ and the solvent was evaporated under reduced pressure. The crude was purified by column chromatography on silica gel 5% MeOH in CHCl$_3$ as eluent. Yield: 60%. $^1$H NMR (500 MHz, CDCl$_3$): δ=8.85 (s, 1H), 8.69-8.67 (d, J=9.5 Hz, 2H), 8.45 (s, 1H), 8.05-8.04 (d, J=8.5 Hz, 2H), 7.86-7.84 (d, J=8.5 Hz, 2H), 7.79-7.77 (d, J=9.0 Hz, 2H), 7.64-7.61 (m, 2H), 7.56-7.56 (m, 2H), 7.31-7.29 (d, J=14.5 Hz, 2H), 4.25-4.23 (m, 6H), 3.865-3.80 (m, 6H), 3.73-3.71 (m, 6H), 3.67-3.63 (m, 12H), 3.55-3.52 (m, 6H), 3.38 (s, 3H), 3.33 (s, 6H) ppm; $^{13}$C NMR (125 MHz, CDCl$_3$): δ=165.51, 152.50, 142.13, 138.86, 134.16, 132.55, 132.37, 131.23, 129.92, 128.71, 127.54, 127.25, 126.82, 126.58, 125.71, 120.21, 119.07, 117.46, 108.16, 100.83, 85.98, 77.29, 77.04, 76.79, 72.41, 71.95, 71.90, 70.67, 70.58, 70.52, 70.41, 69.88, 69.26, 59.03, 58.97.

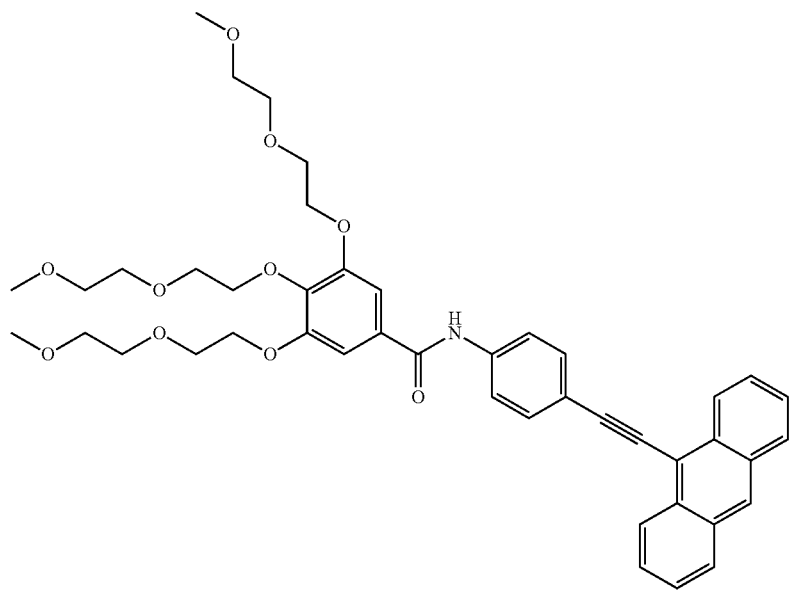 [SMILES: COCCOCCOc1cc(C(=O)Nc2ccc(C#Cc3c4ccccc4cc4ccccc34)cc2)cc(OCCOCCOC)c1OCCOCCOC]

Example 8. Synthesis of (E)-3,4,5-tris(2-(2-(2-methoxyethoxy)ethoxy)ethoxy)-N-(4-(phenyldiazenyl) phenyl)benzamide

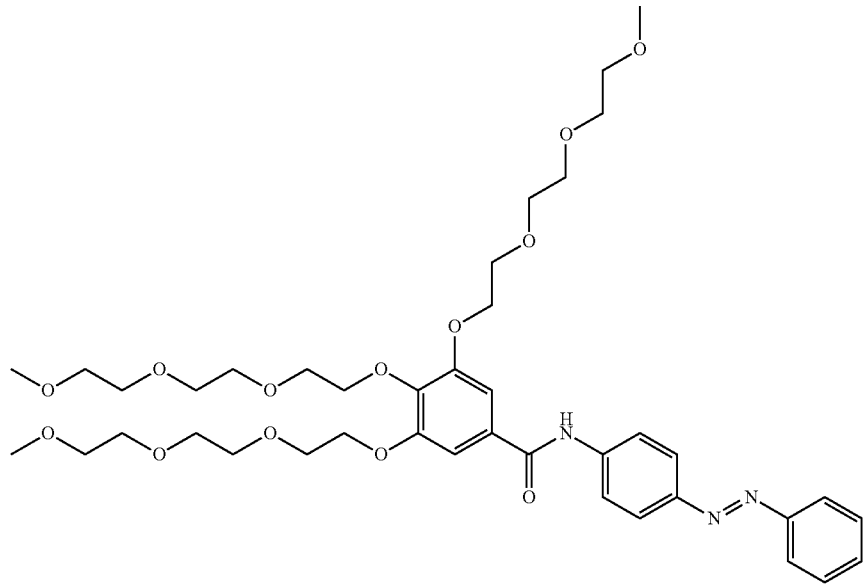 [SMILES: COCCOCCOCCOc1cc(C(=O)Nc2ccc(/N=N/c3ccccc3)cc2)cc(OCCOCCOCCOC)c1OCCOCCOCCOC]

Trans-4-(phenyldiazenyl) aniline (1.038 g, 1.1 equiv) was dissolved in dry toluene (20 mL) in a two-neck round bottom flask under nitrogen. Dry triethylamine (2 mL) was added to the flask and allowed the reaction mixture to stir at room temperature for 15 min. 3,4,5-tris(2-(2-(2-methoxyethoxy) ethoxy) ethoxy) benzoyl chloride (3 g) dissolved in dry toluene (10 mL) was added dropwise. The reaction mixture was allowed to stir at room temperature for 12 h. Toluene was evaporated and the residue was extracted using chloroform. The organic layer was washed with water, brine and dried over anhydrous sodium sulphate. The organic extract was concentrated in vacuo and the residue was purified by silica gel column chromatography using 3% ethylacetate/hexane as an eluent. Yield: 70%; 1H NMR (300 MHz, CDCl3): δ=8.93 (s, 1H), 7.97 (d, J=8.7 Hz, 2H), 7.91 (d, J=8.7 Hz, 2H), 7.84 (s, 2H), 7.63 (t, 2H) 7.52 (t, 1H), 7.30 (s, 2H), 4.28-4.14 (t, 6H), 3.84-3.87 (t, 6H), 3.52-3.65 (m, 48H), 3.37 (s, 9H) ppm; HRMS-FAB (m/z): [M+H]+ calcd. for C40H57N3O13, 876.53; found, 788.3912.

Example 9. Synthesis of N-(4-((12-(anthracen-9-yl)-11-(4-(3,4,5-tris(2-(2-(2-methoxy ethoxy)ethoxy) ethoxy)benzamido)phenyl)-9,10-ethenoanthracen-9 (10H)-yl)ethynyl)phenyl)-3,4,5-tris(2-(2-(2-methoxyethoxy)ethoxy)ethoxy) benzamide

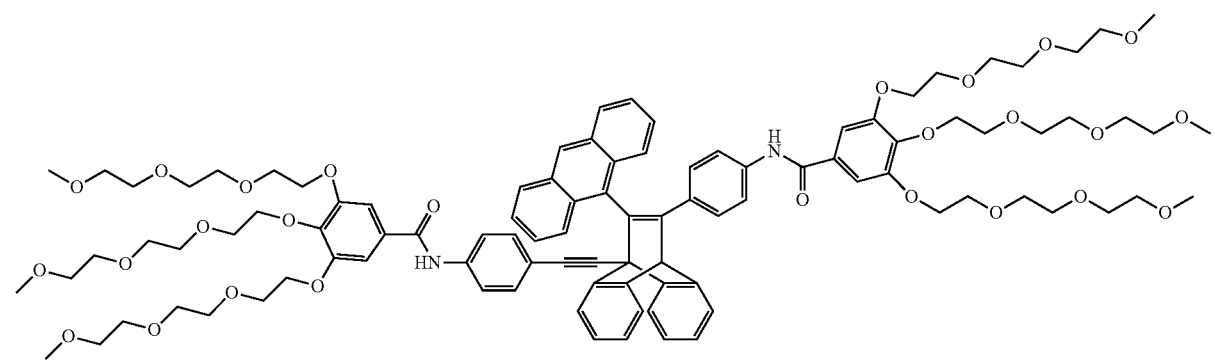

A solution of N-(4-(anthracen-9-ylethynyl)phenyl)-3,4,5-tris(2-(2-methoxyethoxy)ethoxy) benzamide (15.0 mg, 16.9 µmol) in degassed toluene (3 mL) in a sealed quartz vessel was irradiated for 20 h with UV light of wavelength 365 nm. The crude mixture was then purified by column chromatography on silica gel using $CHCl_3$:MeOH (95:5) as a eluent to obtain the photoadduct (Yield=10.8 mg, 70%). $^1H$ NMR (500 MHz, $CDCl_3$): δ=8.69 (s, 1H), 8.49 (d, 2H), 8.31 (d, 2H), 7.73-7.72 (d, 4H), 7.62 (m, 4H), 7.61 (s, 4H) 7.21 (d, 4H), 7.17 (m, 11H), 7.07 (6H), 7.07 (m, 3H), 6.94 (m, 3H), 6.44 (d, 2H), 5.74 (s, 1H) 4.16-4.04 (m, 22H), 3.76-3.20 (m, 136H). $^{13}C$-NMR (CDCl3): δ=165.39, 152.42, 152.32, 148.42, 145.40, 144.73, 143.97, 131.95, 131.39, 130.56, 128.38, 126.83, 125.57, 125.25, 125.14, 125.02, 122.73, 107.60, 91.06, 84.26, 70.64, 59.05, 58.95, 58.89, 58.36, 56.26, 29.67.

Example 10. Fabrication of the Prototype Dynamic Windows

A molecule selected from the class of molecules of Formula 1 as prepared from above example, was dissolved in water or water/THF mixture (maximum 10% THF) to obtain a final concentration of 0.025-5 mM. A water-soluble dye of any color was optionally added to the above solution (final ratio of dye to active materials was 1:100-1:1000). The above solution was sandwiched between two glass plates (up to 10 cm×10 cm), separated by a spacer and the glass plates were sealed from all sides. The said window was exposed to the predetermined set of temperature to tune its opacity/transparency.

Advantages of the Invention

The invention provides thermo-responsive molecules with switching temperature near room temperature (25-30° C.) without the need for additional energy input. The said thermo-responsive molecules are easy to synthesize, handle and scale up to large area fabrication is feasible in a cost-effective manner. Small amounts of active thermo-responsive material are required (0.025-5 mM concentration) to fabricate the windows. Water is used as the primary solvent in the dynamic windows and thus the system represents environment-friendly system. Multiple colors are readily achieved using water-soluble dyes. Sandwich type design of windows allows reuse of existing window glass panels.

We claim:

1. A molecule of Formula 1

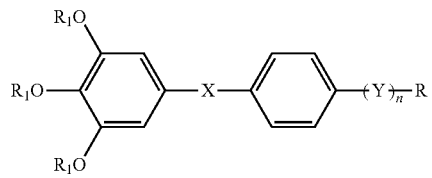

Formula 1 wherein, $R_1$ is independently selected from $[(CH_2)_a—O]_b$—$CH_3$ wherein a is 1 or 2; b is 8 to 12; X is selected from the group consisting of

—C═C—, and —C≡C—;

Y is selected from —N═N— and —C≡C—; n is 0 or 1;

R is selected from hydrogen, halogen and $C_{6-25}$ aryl, wherein said $C_{6-25}$ aryl may be optionally substituted with a substituent selected from the group consisting of halogen, OH, CN, —O($C_1$-$C_{30}$ alkyl), —(NH)$_{1-2}$($C_1$-$C_{30}$ alkyl chain), —N($C_1$-$C_{30}$ alkyl)$_2$, COOH, and —COO($C_1$-$C_{30}$ alkyl); or

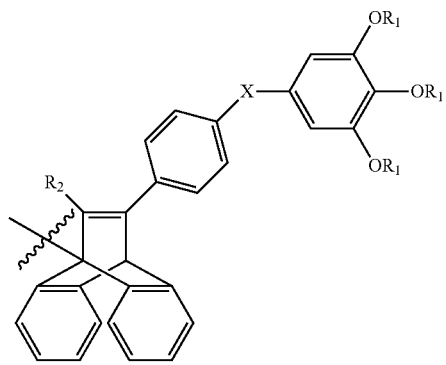

wherein $R_2$ is $C_{6-25}$ aryl, wherein said —$C_{6-25}$ aryl may be optionally substituted with a substituent selected from the group consisting of halogen, OH, CN, —O($C_1$-$C_{30}$ alkyl), —(NH)$_{1-2}$($C_1$-$C_{30}$ alkyl), —N($C_1$-$C_{30}$ alkyl)$_2$, COOH, and —COO($C_1$-$C_{30}$ alkyl).

2. The molecule having formula 1 according to claim 1, wherein X is

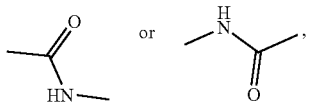

and Y is —N═N— or —C≡C—.

3. The molecule having formula 1 according to claim 1, wherein R is selected from the group consisting of hydrogen, halogen and $C_{6-14}$ aryl, wherein said $C_{6-14}$ aryl may be optionally substituted with a substituent selected from the group consisting of halogen, OH, CN, —O($C_1$-$C_{12}$ alkyl), —NH($C_1$-$C_{12}$ alkyl), —N($C_1$-$C_{12}$ alkyl chain)$_2$, and —COO($C_1$-$C_{12}$ alkyl); or

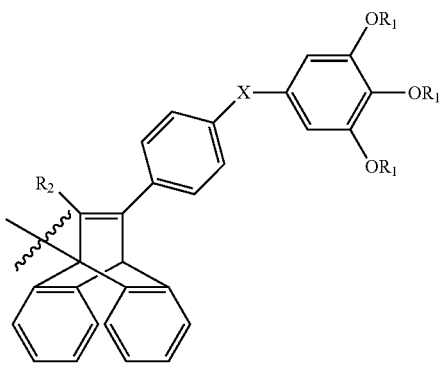

and, $R_2$ is selected from $C_{6-14}$ aryl, wherein said $C_{6-14}$ aryl may be optionally substituted with a substituent selected from the group consisting of halogen, OH, CN, —O($C_1$-$C_{12}$ alkyl), —NH($C_1$-$C_{12}$ alkyl), —N($C_1$-$C_{12}$ alkyl)$_2$, and —COO($C_1$-$C_{12}$ alkyl).

4. A solution comprising the molecule of Formula 1 according to claim 1, wherein R is selected from hydrogen, halogen or $C_{6-14}$ aryl and X is

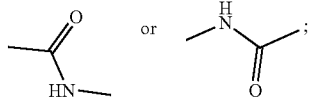

Y is —N═N— or —C≡C—; and $R_1$ is [(CH$_2$)$_a$—O]$_b$—CH$_3$, a is 1 or 2 and b is 8 to 12, at a concentration in the range of 0.25-5 mM in a solvent, wherein the solvent is selected from the group consisting of water, tetrahydrofuran (THF) and water-THF binary mixture, wherein the amount of THF is in the range of 10-20% of the total volume, the solution showing a temperature tunable transparency, and the solution turns opaque above its lower critical solution temperature (LCST), the said temperature in the range of 23° C.-35° C.

5. The solution of the molecule of Formula 1 in according to claim 4, wherein the concentration of the molecule is 1-5 mM and the temperature tunable transparency is in the range of 28° C.-32° C.

6. A Dynamic window fabricated by sandwiching the solutions of molecules of Formula 1 according to claim 4 between two glass panes thereby allowing tunability of transparency via controlled LCST phase transitions triggered by controlled temperature exposure at temperatures in the range of 25° C.-35° C.

7. The dynamic window according to claim 6, wherein the dynamic window renders light and/or dark yellow and/or orange color in light transmission mode and opaque yellow and/or orange shade above 30° C.

8. The dynamic window according to claim 6, wherein the dynamic window has color tunability spanning the RGB color space via controlled addition of water-soluble dyes at defined weight compositions in the range of 1:100 to 1:1000 (dye:Formnula 1), wherein the water-soluble dyes are selected from the group consisting of methylene blue, rhodamine B, nile blue, methyl orange, malachite green, rose Bengal, and combinations thereof.

9. The dynamic window according to claim 6, wherein the dynamic window is utilized for energy-efficient buildings in indoor environments and result in a decrease of indoor temperature in the range of 3° C. to 5° C.

10. A solution of the molecule of Formula 1 according to claim 1, wherein R is:

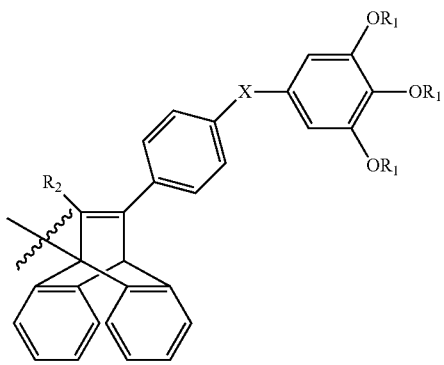

wherein, $R_2$ is $C_{6-14}$ aryl, wherein said $C_{6-14}$ aryl may be optionally substituted with a substituent selected from the group consisting of halogen, OH, CN, —O($C_1$-$C_{12}$ alkyl), —NH($C_1$-$C_{12}$ alkyl), —N(($C_1$-$C_{12}$ alkyl))$_2$, and —COO($C_1$-$C_{12}$ alkyl), wherein X is

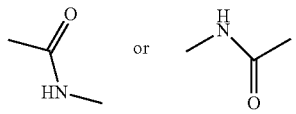

Y is —C≡C— and $R_1$ is is [(CH$_2$)$_a$—O]—CH$_3$, a is 1 or 2, b is 8 to 12, at concentration in the range of 0.006 mM-0.1 mM, in water or water-THF binary mixture, wherein the amount of THF is in the range of 10-20% of the total volume, the said solution showing temperature tunable transparency, said solution turns opaque above its LCST, said temperature in the range of 25° C.-30° C.

11. The solution of the molecule of Formula 1 according to claim 10, wherein the concentration of the molecule is in the range of 0.025-0.1 mM and the temperature tunable transparency is in the range of 25° C.-27° C.

12. A molecule selected from the group consisting of
a) 3,4,5-tris(2-(2-(2-methoxyethoxy)ethoxy)ethoxy)-N-phenyl benzamide;
b) 3,4,5-tris(2-(2-methoxyethoxyl)ethoxy)-N-(4-(phenyl ethynyl)phenyl)benzamide;
c) 3,4,5-tris(2-(2-methoxyethoxy)ethoxy)-N-(4-(naphthalen-1-ylethynyl) phenyl) benzamide;
d) N-(4-(anthracen-9-ylethynyl)phenyl)-3,4,5-tris(2-(2-methoxyethoxy) ethoxy) benzamide;
e) (E)-3,4,5-tris(2-(2-(2-methoxyethoxy)ethoxy)ethoxy)-N-(4-(phenyldiazenyl) phenyl) benzamide; and
f) N-(4-((12-(anthracen-9-yl)-11-(4-(3,4,5-tris(2-(2-(2-methoxy ethoxy) ethoxy) ethoxy) benzamido) phenyl)-9,10-ethenoanthracen-9 (10H)-yl) ethynyl) phenyl)-3,4,5-tris(2-(2-(2-methoxyethoxy) ethoxy) ethoxy) benzamide.

* * * * *